United States Patent [19]
Leaver

[11] Patent Number: 5,644,197
[45] Date of Patent: Jul. 1, 1997

[54] CATHODE RAY TUBE DISPLAY APPARATUS WITH ROTATABLE RASTER

[75] Inventor: David Leaver, Sussex, United Kingdom

[73] Assignee: International Business Machines Corporation, Armonk, N.Y.

[21] Appl. No.: 408,512

[22] Filed: Mar. 22, 1995

[51] Int. Cl.$^6$ .................................................. H01J 29/78
[52] U.S. Cl. .................... 315/378; 348/583; 345/126
[58] Field of Search ................................ 315/399, 378; 348/583; 345/126

[56] References Cited

U.S. PATENT DOCUMENTS 2,646,529  7/1953  Werenfels et al. .
3,098,943  7/1963  Reiches .
3,772,677  11/1973  Sommer .

*Primary Examiner*—Theodore M. Blum
*Attorney, Agent, or Firm*—Scully, Scott, Murphy & Presser

[57] ABSTRACT

Cathode ray tube display apparatus includes a cathode ray tube having a screen (210) and a neck (350). In use an electron beam is directed from the neck (350) towards the screen (210) along an axis (S) of the cathode ray tube containing the centre of the screen (210). However, deflection means (320) mounted on the neck (350) deflects the beam from the axis (S) at a deflection centre (X) of the cathode ray tube to scan the beam across the screen (210) in a raster pattern. Raster rotation means (300, 310) permits rotation of the raster pattern about the centre of the screen (210). The raster rotation means (300, 310) includes first and second coils. The first coil (300) is located around the neck (350) at or near the deflection centre (X) to generate, in use, a first magnetic field in the path of the electron beam. The second coil (310) is parallel to the first coil (300) and located around the neck (350) on the side of the deflection centre (X) remote from the screen (210) to generate, in use, a second magnetic field, of opposite polarity to the first field, in the path of the electron beam.

27 Claims, 3 Drawing Sheets

CATHODE RAY TUBE DISPLAY APPARATUS WITH ROTATABLE RASTER

The present invention relates to cathode ray tube (CRT) display apparatus for generating a raster-scanned image which can be rotated relative to the CRT display screen.

A conventional colour CRT display comprises a colour CRT supported in a bezel and electrically connected to display drive circuitry. The CRT includes a screen internally coated with phosphor material, a neck, and a bell-shaped portion between the screen and the neck. The neck houses Red, Green and Blue electron guns. The display drive circuitry comprises line and frame scan circuits, an Extra High Tension (EHT) generator and a video amplifier connected to the electron guns. Line and frame deflection coils are disposed around the neck of the CRT. The deflection coils are connected to the line and frame scan circuits. In operation, EHT generator generates an electric field within the CRT for accelerating electrons in beams corresponding to the primary colours of red, green and blue towards corresponding red, green and blue phosphor dots on the screen of the CRT. An electrically conductive shadow mask overlaying the phosphor screen in the CRT guides the electron beams towards the corresponding phosphor dots. The line and frame scan circuits generate line and frame scan currents in the deflection coils. The line and frame scan currents are in the form of ramp signals to produce time-varying magnetic fields that scan the electron beams across the screen of the CRT in a raster pattern. The line and frame scan signals are synchronised by line and frame scan circuits to input line and frame synchronisation (sync) signals H and V from a video source such as a broadcast television receiver, personal computer or the like. The video amplifier modulates the red, green and blue electron beams to produce an output display on the CRT as a function of corresponding R, G and B input video signals generated by the video source.

A white character is formed in the output display on the CRT by the overlaid red, green, and blue images as traced out by the red, green, and blue electron beams respectively. Ideally, these images spatially coincide. In general, however, the images do not precisely coincide at all points on the screen. Instead, a mis-convergence of typically 0.3 mm can be detected, usually in the corners of the screen. The misconvergence appears in the displayed output as coloured fringing on one side of displayed characters.

In addition to mis-convergence, the displayed output may also exhibit colour purity errors. Colour purity errors occur when an electron beam of one colour is guided onto a phosphor dot of a different colour. This may caused by the shadow mask distorting or becoming magnetised in use.

It is desirable for the raster, and therefore the rectangular image displayed on the CRT screen, to be aligned with the bezel. This gives a pleasing appearance and maximises the available screen area in which an image can be displayed without loss of data. However, the raster may be undesirably skewed with respect to the bezel. Such raster skew can occur due to any one or combination of more than one of: mechanical misalignment of the CRT with respect to the bezel; mechanical misalignment of the deflection coils on the CRT; mechanical mis-alignment of the electron guns within the CRT; and, external magnetic fields such as, for example, the Earths magnetic field. It will be appreciated that the influence of the Earths magnetic field on raster rotation will vary with geographical location and CRT orientation.

In accordance with the present invention, there is now provided cathode ray tube display apparatus including: a cathode ray tube having a screen and a neck; means for directing an electron beam from the neck towards the screen along an axis of the cathode ray tube containing the centre of the screen; and deflection means mounted on the neck for deflecting the beam from the axis at a deflection centre of the cathode ray tube to scan the beam across the screen in a raster pattern; and raster rotation means for rotating the raster pattern about the centre of the screen; characterised in that the raster rotation means includes a first coil located around the neck at or near the deflection centre to generate, in use, a first magnetic field in the path of the electron beam; and, a second coil parallel to the first coil and located around the neck on the side of the deflection centre remote from the screen to generate, in use, a second magnetic field, of opposite polarity to the first field, in the path of the electron beam.

The field from the first coil provides raster rotation. Simultaneously, the second coil generates a field in the neck which corrects the convergence and purity errors that-would otherwise result as the raster is rotated under the field of the first coil. The present invention thereby permits controlled rotation of the raster without affecting colour purity or convergence.

The first and second coils may be connected in series, in which case it is preferable for the first coil to have a greater number of turns than the second coil. Alternatively, the first and second coils may be connected in parallel, in which case it is preferable for the second coil to have a greater number of turn s than the first coil. In both cases, the apparatus preferably includes a DC voltage source for applying a DC voltage across the coils.

In a preferred embodiment of the present invention, there is provided control means connected to the voltage source for varying the DC voltage applied across the coils by the voltage source to vary the current flow in the coils. The control means preferably includes means for reversing the direction of current flow through the coils.

In a particularly preferred embodiment of the present invention, there is provided, manual input means connected to the control means for adjusting the current flow in the coils in response to a manual input. Preferably, sufficient current is made available to permit rotation of the raster within a range of around two degrees in either direction.

Viewing the present invention from another aspect, there is now provided, in cathode ray tube display apparatus including a cathode ray tube having a screen and a neck, means for directing an electron beam from the neck towards the screen along an axis of the cathode ray tube containing the centre of the screen, and deflection means mounted on the neck for deflecting the beam from the axis at a deflection centre of the cathode ray tube to scan the beam across the screen in a raster pattern, a method for rotating the raster pattern about the centre of the screen, the method including: generating a first magnetic field in the path of the electron beam using a first coil located around the neck at or near the deflection centre; and, generating a second magnetic field, of opposite polarity to the first field, in the path of the electron beam using a second coil parallel to the first coil and located around the neck on the side of the deflection centre remote from the screen.

Preferred embodiments of the present invention will now be described, by way of example only, with reference to the accompanying drawings, in which.

Figure 1:
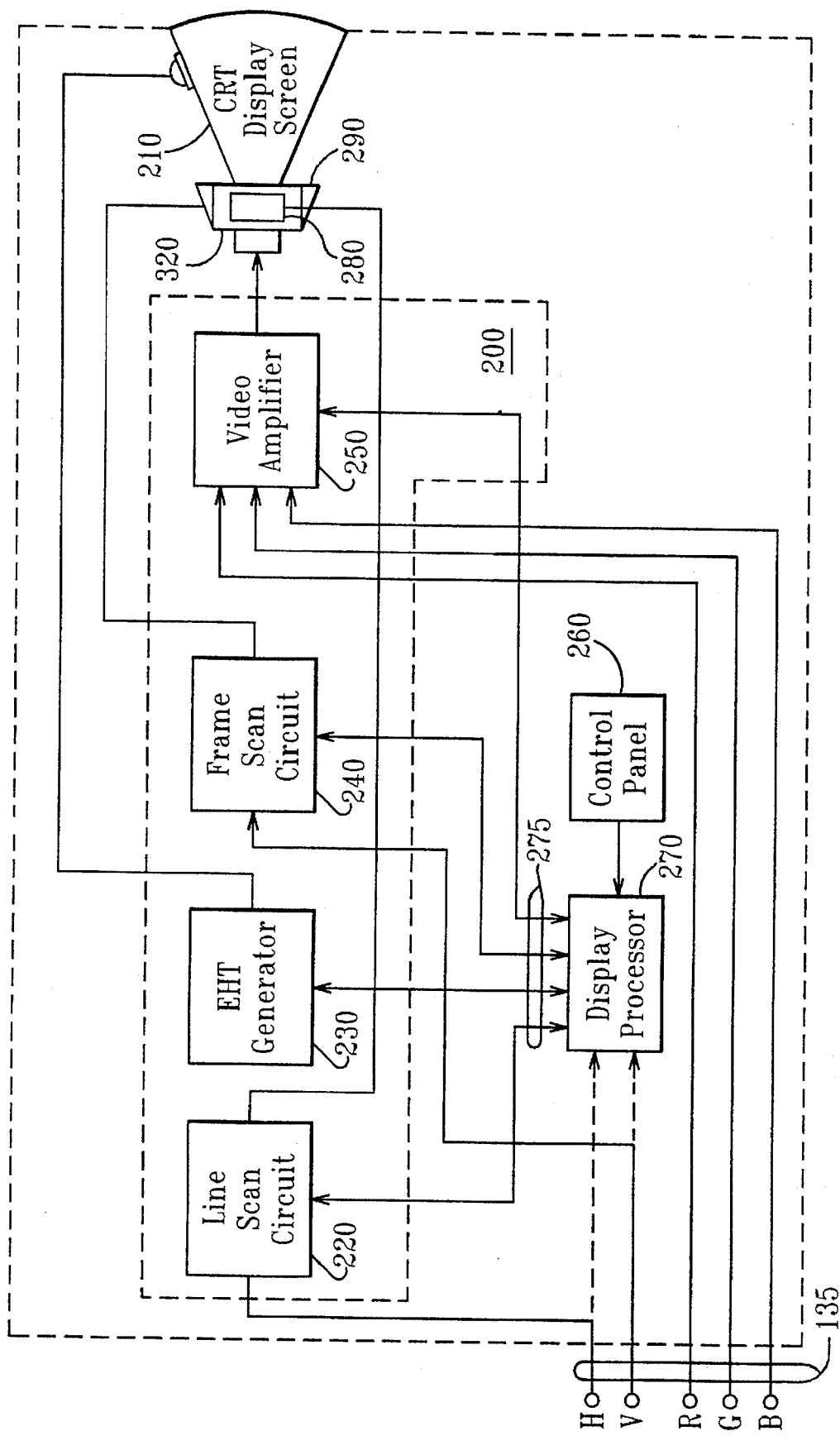
FIG. 1 is a block diagram of a CRT display.

Referring first to FIG. 1, a CRT display of the present invention comprises a colour cathode ray display tube (CRT) display screen 210 connected to display drive circuitry 200. Display drive circuitry 200 comprises an Extra High Tension (EHT) generator 230 and a video amplifier 250 connected to display screen 210. Line and frame deflection coils 290 and 280 are disposed around the neck of the CRT on a yoke 320. Deflection coils 290 and 280 are connected to line and frame scan circuits 220 and 240 respectively. Line scan circuit 220 and EHT generator 230 may each be in the form of a flyback circuit, the operation of which is well known by those skilled in the art. Furthermore, as is also well-known in the art, EHT generator 230 and line scan circuit 220 may be integrated in a single flyback circuit. A power supply (not shown) is connected via power supply rails (not shown) to EHT generator 230, video amplifier 250, and line and frame scan circuits 220 and 240. In use, the power supply provides electrical power on the supply rails from Line and Neutral connections (not shown) to the domestic electricity mains supply. The power supply may be in the form of a switch mode power supply, the operation of which is well-understood by those skilled in the art.

EHT generator 230, video amplifier 250, and line and frame scan circuits 220 and 240 are each connected to a display processor 270. Display processor 270 includes a microprocessor. A user control panel 260 is provided on the front of display device 130. Control panel 260 includes a plurality of manual operable switches. User control panel is connected to key-pad interrupt lines of processor 270.

In operation, EHT generator 230 generates an electric field within CRT 210 for accelerating electrons in beams corresponding to the primary colours of red, green and blue towards the screen of CRT. Line and frame scan circuits 220 and 240 generate line and frame scan currents in deflection coils 290 and 280. The line and frame scan currents are in the form of ramp signals to produce time-varying magnetic fields that scan the electron beams across the screen of CRT 210 in a raster pattern. The line and frame scan signals are synchronised by line and frame scan circuits to input line and frame synchronisation (sync) signals H and V generated by a video source such as a personal computer system unit, for example. Video amplifier 250 modulates the red, green and blue electron beams to produce an output display on CRT 210 as a function of corresponding red, green and blue input video signals R, G and B also generated by the video source.

Display processor 270 is configured to control the outputs of EHT generator 230, video amplifier 250, and line and frame scan circuits 220 and 240 via control links 275 as functions of preprogrammed display mode data and inputs from user control 260. The display mode data includes sets of preset image parameter values each corresponding to a different popular display mode such as, for example, 1024× 768 pixels, 640×480 pixels, or 1280×1024 pixels. Each set of image display parameter values includes height and centring values for setting the output of frame scan circuit 240; and width and centring values for controlling line scan circuit 220. In addition, the display mode data includes common preset image parameter values for controlling the gain and cut-off of each of the red, green and blue channels of video amplifier 250; and preset control values for controlling the outputs of EHT generator 240. The image parameter values are selected by display processor 270 in response to mode information from the video source. Display processor 270 processes the selected image parameter values to generate analog control levels on the control links.

A user can manually adjust, via user control 260, control levels sent from display processor 270 to drive circuitry 250 to adjust the geometry of the displayed picture according to personal preference. User control panel 260 includes a set of up/down control keys for each of image height, centring, width, brightness and contrast. Each of the keys controls, via display processor 270, a different one or combination of the control levels, such as those controlling red green and blue video gains and cutoffs at video amplifier 250; and those controlling image width, height, and centring at line and frame scan circuits 220 and 240.

The control keys are preferably in the form of push-buttons connected to key-pad interrupt inputs 320 to display processor 270. When, for example, the width up key is depressed, user control panel 260 issues a corresponding interrupt to display processor 270. The source of the interrupt is determined by display processor 270 via an interrupt polling routine. In response to the interrupt from the width key, display processor 270 progressively increases the corresponding analog control level sent to line scan circuit 220. The width of the image progressively increases. When the desired width is reached, the user releases the key. The removal of the interrupt is detected by display processor 270, and the digital value setting the width control level is retained. The height, centring, brightness and contrast setting can be adjusted by the user in similar fashion. User control panel 260 preferably further includes a store key. When the user depresses the store key, an interrupt is produced to which display processor 270 responds by storing in memory parameter values corresponding the current settings of the digital outputs to D to A convertor as a preferred display format. The user can thus programme into display 130 specific display image parameters according to personal preference.

Figure 2:
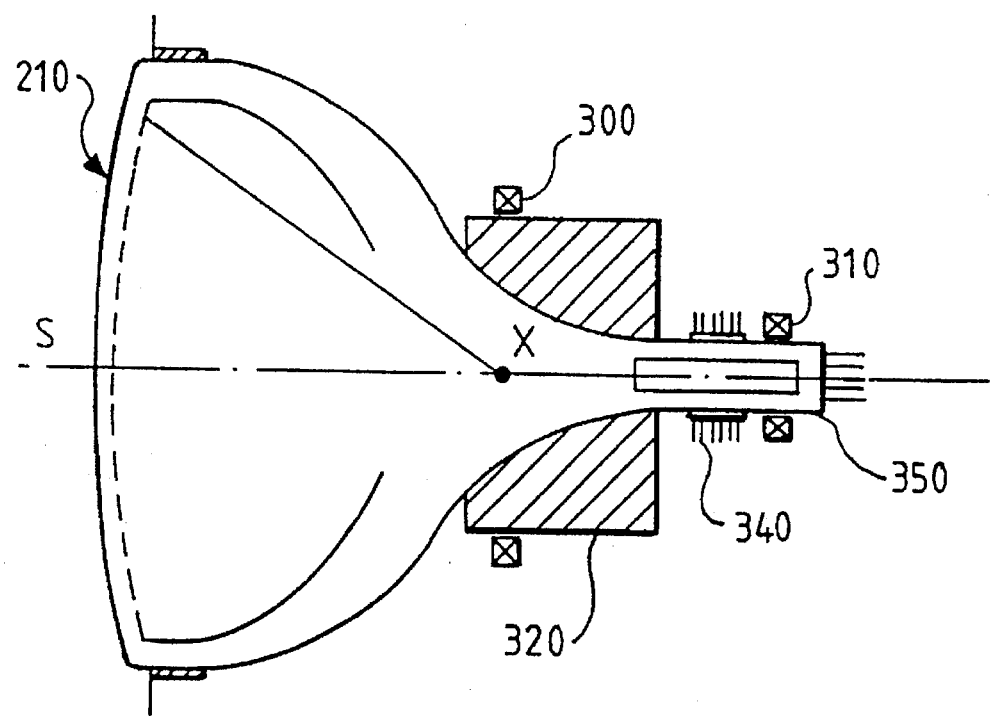
FIG. 2 is a side view of a CRT of the CRT display.

Referring now to FIG. 2, CRT 210 has a horizontal axis of symmetry S, which is the path followed by the undeflected electrons beams from the electron guns to the centre of the display screen. A deflection centre X is located on axis S- Deflection centre X is the point at which all deflected electron beams appear to depart from axis S. An assembly 340 of permanent magnets for optimising colour purity and beam convergence is disposed around the neck 350 of CRT 210. In accordance with the present invention, the display device includes first and second raster rotation coils 300 and 310. First coil 300 is disposed around yoke 320 in a plane normal to axis S and containing, or at least close to, deflection centre X. Second coil 320 is located around the neck of CRT 210 on the side of the purity/convergence assembly remote from yoke 320.

Figure 3:
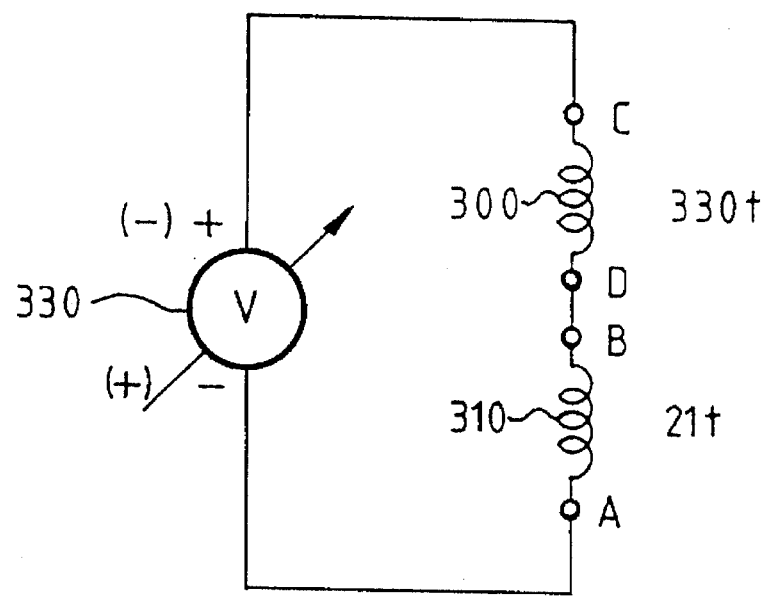
FIG. 3 is a circuit diagram of raster rotation coils for the display.

Referring now to FIG. 3, in one embodiment of the present invention, coil 300 and coil 310 are connected in series across a variable DC voltage source 330. Specifically, source 330 is arranged to permit the voltage applied across coils 300 and 310 to be reversed in addition to increased and decreased. DC current can thus be passed through the coils in either direction. When DC current flows through coil 300, a constant magnetic field is set up within the CRT at or near deflection centre X. The field causes the raster to rotate in accordance with Flemings Left Hand Rule. The degree of rotation depends on the magnetic field strength which, in turn, depends on the amount of current flowing in coil 300. The direction of rotation depends on the direction of current flow through coil 300. The same current that flows through coil 300 also flows through coil 310.

In operation, as the field from coil 300 provides the desired raster rotation, coil 310 generates a field in the neck of CRT 210 which corrects the convergence and purity errors that would otherwise result as the raster is rotated via coil 300. The present invention thereby permits controlled rotation of the raster without affecting colour purity or convergence. Preferably, sufficient current is made available to permit rotation of the raster within a range of around two degrees in either direction. User control 260 includes a pair of keys for controlling the output of source 330 via display processor 270. One key permits the user to rotate the raster clockwise within the above-mentioned range. The other key permits the user to rotate to the raster anti-clockwise with the above-mentioned range. In the series arrangement, coil 300 may have, for example, 330 turns, and coil 310 may have for example, 21 turns.

Figure 4:
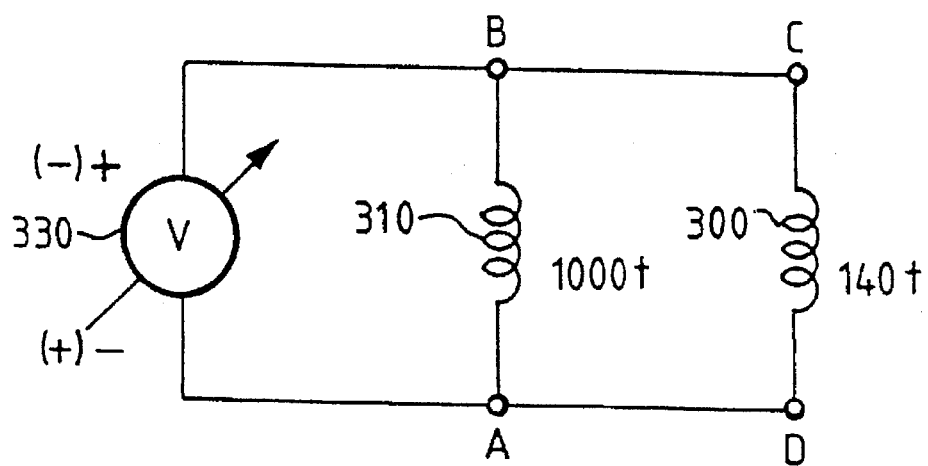
FIG. 4 is another circuit diagram of raster rotation coils for the display; and, FIG. 5 is a side view of the raster rotation coils on the CRT.

Referring now to FIG. 4, in another embodiment of the present invention, coils 300 and 310 are connected in parallel across source 330.

Source 330 thus permits the voltage applied across both coil 300 and coil 310 to be reversed in addition to increased and decreased. Thus, again, DC current can be passed through the coils in either direction. The functions of coils 300 and 310 in the parallel arrangement are essentially the same as those hereinbefore described with reference to the series arrangement in FIG. 4. However, it will be appreciated that, in the parallel arrangement, the current flowing in coil 300 is not necessarily the same as that flowing in coil 310. The same key button in user control 260 can be used to manually adjust the effect provided by the parallel arrangement. In the parallel arrangement hereinbefore described, coil 300 may have, for example, 140 turns, and coil 310 may have for example, 1000 turns.

Figure 5:
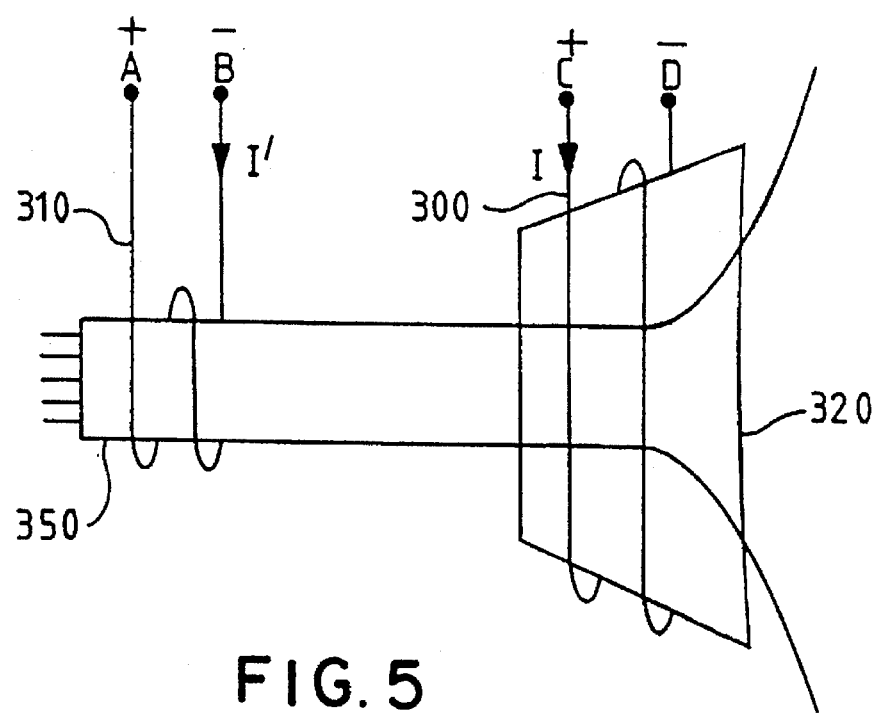

Referring now to FIG. 5, the currents flowing through coils 300 and 310 are I and I' respectively. In the series arrangement of FIG. 3, it will be appreciated that I' and I are the same. The arrowheads indicate the direction of current flow require through coils 300 and 310 to produce anti-clockwise raster rotation. Coils ends A, B, C, and D correspond to nodes A, B, C and D in FIGS. 3 and 4.

In general the number of turns in each of coils 300 and 310 is adjusted so that the convergence errors introduced by coil 300 are cancelled by a correcting field introduced in the neck of CRT 210 by coil 310. This advantageously provides raster rotation function with reduced purity and convergence errors.

I claim:

1. A cathode ray rube display apparatus including: a cathode ray tube having a screen (210) and a neck (350); means for directing an electron beam from the neck (350) towards the screen (210) along an axis (S) of the cathode ray tube containing the centre of the screen (210);
   deflection means (320) mounted on the neck (350) for deflecting the beam from the axis (S) at a deflection centre (X) of the cathode ray tube to scan the beam across the screen (210) in a raster pattern; and raster rotation means (300, 310) for rotating the raster pattern about the centre of the screen (210); wherein the raster rotation means (300, 310) includes a first coil (300) located around the neck (350) at or near the deflection centre (X) to generate, in use, a first magnetic field in the path of the electron beam; and a second coil (310) parallel to the first coil (300) and located around the neck (350) on the side of the deflection centre (X) remote from the screen (210) to generate, in use, a second magnetic field, of opposite polarity to the first field, in the path of the electron beam, and wherein the first and second coils are connected in series.

2. Apparatus as claimed in claim 1, wherein the first and second coils are connected in series.

3. A cathode ray tube display apparatus including: a cathode ray tube having a screen (210) and a neck (350); means for directing an electron beam from the neck (350) towards the screen (210) along an axis (S) of the cathode ray tube containing the centre of the screen (210); deflection means (320) mounted on the neck (350) for deflecting the beam from the axis (S) at a deflection centre (X) of the cathode ray tube to scan the beam across the screen (210) in a raster pattern; and raster rotation means (300, 310) for rotating the raster pattern about the centre of the screen (210), wherein the raster rotation means (300, 310) includes a first coil (300) located around the neck (350) at or near the deflection centre (X) to generate, in use, a first magnetic field in the path of the electron beam; and a second coil (310) parallel to the first coil (300) and located around the neck (350) on the side of the deflection centre (X) remote from the screen (210) to generate, in use, a second magnetic field, of opposite polarity to the first field, in the path of the electron beam, wherein the first and second coils are separated by a color optimizing and beam convergence assembly.

4. An apparatus as claimed in claim 3, wherein the first and second coils are connected in parallel.

5. An apparatus as claimed in claim 4, wherein said first coil is configured to provide raster rotation and said second coil is configured to correct convergence and purity errors caused by said first coil.

6. Apparatus as claimed in claim 3, wherein the second coil has a greater number of turns than the first coil.

7. Apparatus as claimed in claim 1, including a DC voltage source for applying a DC voltage across the coils.

8. Apparatus as claimed in claim 7, including control means connected to the voltage source for varying the DC voltage applied across the coils by the voltage source to vary the current flow in the coils.

9. Apparatus as claimed in claim 8, wherein the control means includes means for reversing the direction of current flow through the coils.

10. Apparatus as claimed in claim 9, including manual input means connected to the control means for adjusting the current flow in the coils in response to manual input.

11. Apparatus as claimed in claim 8, including manual input means connected to the control means for adjusting the current flow in the coils in response to a manual input.

12. An apparatus as claimed in claim 1, wherein said first coil is configured to provide raster rotation and said second coil is configured to correct convergence and purity errors caused by said first coil.

13. In cathode ray tube display apparatus including a cathode ray tube having a screen and a neck, means for directing an electron beam from the neck towards the screen along an axis of the cathode ray tube containing the centre of the screen, and deflection means mounted on the neck for deflecting the beam from the axis at a deflection centre of the cathode ray tube to scan the beam across the screen in a raster pattern, a method for rotating the raster pattern about the centre of the screen, the method including: generating a first magnetic field in the path of the electron beam using a first coil located around the neck at or near the deflection centre; and, generating a second magnetic field, of opposite polarity to the first field, in the path of the electron beam using a second coil parallel to the first coil and located around the neck on the side of the deflection centre remote from the screen, wherein the first coil and the second coil are electrically connected in series.

14. A method as claimed in claim 13, wherein the step of generating said first magnetic field provides raster rotation, and the step of generating said second magnetic field corrects convergence and purity errors caused by said first magnetic field.

15. In a cathode ray tube display apparatus including a cathode ray tube having a screen and a neck, means for directing an electron beam from the neck towards the screen along an axis of the cathode ray tube containing the centre of the screen, and deflection means mounted on the neck for deflecting the beam from the axis at a deflection centre of the cathode ray tube to scan the beam across the screen in a raster pattern, a method for rotating the raster pattern about the centre of the screen, the method including: generating a first magnetic field in the path of the electron beam using a first coil located around the neck at or near the deflection centre; and, generating a second magnetic field, of opposite polarity to the first field, in the path of the electron beam using a second coil parallel to the first coil and located around the neck on the side of the deflection centre remote from the screen, wherein the first and second coils are separated by a color optimizing and beam convergence assembly.

16. A method as claimed in claim 15, wherein the first and second coils are connected in parallel.

17. A method as claimed in claim 15, wherein the step of generating said first magnetic field provides raster rotation, and the step of generating said second magnetic field corrects convergence and purity errors caused by said first magnetic field.

18. A cathode ray tube display apparatus including: a cathode ray tube having a screen (210) and a neck (350); means for directing an electron beam from the neck (350) towards the screen (210) along an axis (S) of the cathode ray tube containing the centre of the screen (210); deflection means (320) mounted on the neck (350) for deflecting the beam from the axis (S) at a deflection centre (X) of the cathode ray tube to scan the beam across the screen (210) in a raster pattern; and raster rotation means (300, 310) for rotating the raster pattern about the centre of the screen (210), wherein the raster rotation means (300, 310) is self correcting by having a first coil (300) located around the neck (350) at or near the deflection centre (X) to generate, in use, a first magnetic field in the path of the electron beam which causes raster rotation; and a second coil (310) parallel to the first coil (300) and located around the neck (350) on the side of the deflection centre (X) remote from the screen (210) to generate, in use, a second magnetic field, of opposite polarity to the first field, in the path of the electron beam, the relative currents in the first coil and in the second coil being of magnitudes with respect to one another so that the second coil generates a field in the back to correct convergence and purity errors that otherwise would result when the raster is rotated by the field of the first coil.

19. A cathode ray tube display apparatus including: a cathode ray tube having a screen (210) and a neck (350); means for directing an electron beam from the neck (350) towards the screen (210) along an axis (S) of the cathode ray tube containing the centre of the screen (210); deflection means (320) mounted on the neck (350) for deflecting the beam from the axis (S) at a deflection centre (X) of the cathode ray tube to scan the beam across the screen (210) in a raster pattern; and raster rotation means (300, 310) for rotating the raster pattern about the centre of the screen (210), wherein the raster rotation means (300, 310) includes a first coil (300) located around the neck (350) at or near the deflection centre (X) to generate, in use, a first magnetic field in the path of the electron beam which causes raster rotation; and a second coil (310) parallel to the first coil (300) and located around the neck (350) on the side of the deflection centre (X) remote from the screen (210) to generate, in use, a second magnetic field, of opposite polarity to the first field, in the path of the electron beam, the relative currents in the first coil and in the second coil being of magnitudes with respect to one another so that the second coil generates a field in the back to correct convergence and purity errors that otherwise would result when the raster is rotated by the field of the first coil, wherein the first and second coils are connected in series.

20. An apparatus as claimed in claim 19, wherein the first coil has a greater number of turns than the second coil.

21. An apparatus as claimed in claim 18, wherein the first and second coils are connected in parallel.

22. A cathode ray tube display apparatus including: a cathode ray tube having a screen (210) and a neck (350); means for directing an electron beam from the neck (350) towards the screen (210) along an axis (S) of the cathode ray tube containing the centre of the screen (210); deflection means (320) mounted on the neck (350) for deflecting the beam from the axis (S) at a deflection centre (X) of the cathode ray tube to scan the beam across the screen (210) in a raster pattern; and raster rotation means (300, 310) for rotating the raster pattern about the centre of the screen (210), wherein the raster rotation means (300, 310) includes a first coil (300) located around the neck (350) at or near the deflection centre (X) to generate, in use, a first magnetic field in the path of the electron beam which causes raster rotation; and a second coil (310) parallel to the first coil (300) and located around the neck (350) on the side of the deflection centre (X) remote from the screen (210) to generate, in use, a second magnetic field, of opposite polarity to the first field, in the path of the electron beam, the relative currents in the first coil and in the second coil being of magnitudes with respect to one another so that the second coil generates a field in the back to correct convergence and purity errors that otherwise would result when the raster is rotated by the field of the first coil, wherein the first and second coils are connected in parallel, and wherein the second coil has a greater number of turns than the first coil.

23. In a cathode ray tube display apparatus including a cathode ray tube having a screen and a neck, means for directing an electron beam from the neck towards the screen along an axis of the cathode ray tube containing the centre of the screen, and deflection means mounted on the neck for deflecting the beam from the axis at a deflection centre of the cathode ray tube to scan the beam across the screen in a raster pattern, a self correcting method for rotating the raster pattern about the centre of the screen, the method including: generating a first magnetic field in the path of the electron beam using a first coil located around the neck at or near the deflection centre to cause raster rotation; and, generating a second magnetic field, of opposite polarity to the first field, in the path of the electron beam using a second coil parallel to the first coil and located around the neck on the side of the deflection centre remote from the screen, the relative strengths of the first magnetic field and the second magnetic field being such that convergence and purity errors that otherwise would result when the raster is rotated by the first field are self corrected by the second field.

24. In a cathode ray tube display apparatus including a cathode ray tube having a screen and a neck, means for directing an electron beam from the neck towards the screen along an axis of the cathode ray tube containing the centre of the screen, and deflection means mounted on the neck for deflecting the beam from the axis at a deflection centre of the cathode ray tube to scan the beam across the screen in a raster pattern, a method for rotating the raster pattern about the centre of the screen, the method including: generating a first magnetic field in the path of the electron beam using a first coil located around the neck at or near the deflection centre to cause raster rotation; and, generating a second magnetic field, of opposite polarity to the first field, in the path of the electron beam using a second coil parallel to the first coil and located around the neck on the side of the deflection centre remote from the screen, the relative strengths of the first magnetic field and the second magnetic field being such that convergence and purity errors that otherwise would result when the raster is rotated by the first field are corrected by the second field, wherein the first and second coils are connected in series.

25. A method as claimed in claim 24, wherein the first coil has a greater number of turns than the second coil.

26. A method as claimed in claim 23, wherein the first and second coils are connected in parallel.

27. In a cathode ray tube display apparatus including a cathode ray tube having a screen and a neck, means for directing an electron beam from the neck towards the screen along an axis of the cathode ray tube containing the centre of the screen, and deflection means mounted on the neck for deflecting the beam from the axis at a deflection centre of the cathode ray tube to scan the beam across the screen in a raster pattern, a method for rotating the raster pattern about the centre of the screen, the method including: generating a first magnetic field in the path of the electron beam using a first coil located around the neck at or near the deflection centre to cause raster rotation; and, generating a second magnetic field, of opposite polarity to the first field, in the path of the electron beam using a second coil parallel to the first coil and located around the neck on the side of the deflection centre remote from the screen, the relative strengths of the first magnetic field and the second magnetic field being such that convergence and purity errors that otherwise would result when the raster is rotated by the first field are corrected by the second field, wherein the first and second coils are connected in parallel, and wherein the second coil has a greater number of turns than the first coil.

* * * * *